United States Patent
Cheng et al.

(10) Patent No.: US 12,408,127 B2
(45) Date of Patent: *Sep. 2, 2025

(54) METHODS AND APPARATUSES FOR COLLISION CONTROL OF SIDELINK COMMUNICATIONS IN WIRELESS COMMUNICATION SYSTEM

(71) Applicant: Hannibal IP LLC, Frisco, TX (US)

(72) Inventors: Yu-Hsin Cheng, Hsinchu (TW); Tsung-Hua Tsai, Hsinchu (TW); Chie-Ming Chou, Hsinchu (TW); Yung-Lan Tseng, Hsinchu (TW)

(73) Assignee: Hannibal IP LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/437,327

(22) Filed: Feb. 9, 2024

(65) Prior Publication Data
US 2024/0244545 A1 Jul. 18, 2024

Related U.S. Application Data

(63) Continuation of application No. 17/943,871, filed on Sep. 13, 2022, now Pat. No. 11,963,117, which is a (Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0092* (2013.01); *H04W 72/56* (2023.01); *H04W 92/18* (2013.01)

(58) Field of Classification Search
CPC ............... H04W 56/001; H04W 72/56; H04W 92/18; H04L 5/0092
See application file for complete search history.

(56) References Cited

U.S. PATENT DOCUMENTS

| | | | |
|---|---|---|---|
| 11,172,506 B2 | 11/2021 | Lee et al. | |
| 11,483,782 B2 | 10/2022 | Cheng et al. | |

(Continued)

FOREIGN PATENT DOCUMENTS

| | | |
|---|---|---|
| CN | 104219758 | 12/2014 |
| CN | 106165517 | 11/2016 |

(Continued)

OTHER PUBLICATIONS

3GPP TSG RAN WG1 Meeting #95, R1-1813554, 2018, 7.2.4.1.5, Huawei HiSilicon Design and Contents of PSCCH and PSFCH, Discussion and decision.
(Continued)

*Primary Examiner* — Ayman A Abaza
*Assistant Examiner* — Camquyen Thai
(74) *Attorney, Agent, or Firm* — Cole Schotz P.C.; Marcella M. Bodner

(57) ABSTRACT

A method performed by a wireless communication device includes determining whether to transmit a first Sidelink Synchronization Signal (SLSS) according to a priority parameter when an occasion of the first SLSS collides with a Physical Sidelink Feedback Channel (PSFCH) that carries Sidelink Feedback Control Information (SFCI). The priority parameter is associated with a Physical Sidelink Shared Channel (PSSCH) that corresponds to the PSFCH.

20 Claims, 11 Drawing Sheets

Related U.S. Application Data continuation of application No. 16/710,666, filed on Dec. 11, 2019, now Pat. No. 11,483,782.

(60) Provisional application No. 62/779,597, filed on Dec. 14, 2018.

(51) Int. Cl.
*H04W 72/56* (2023.01)
*H04W 92/18* (2009.01)

(56) References Cited

U.S. PATENT DOCUMENTS

| | | | |
|---|---|---|---|
| 11,963,117 | B2 | 4/2024 | Cheng et al. |
| 2011/0026419 | A1* | 2/2011 | Kim .................... H04W 52/281 370/252 |
| 2015/0124737 | A1 | 5/2015 | Lee |
| 2015/0245276 | A1 | 8/2015 | Lee |
| 2016/0006529 | A1 | 1/2016 | Yi et al. |
| 2016/0037322 | A1 | 2/2016 | Nguyen |
| 2016/0044694 | A1* | 2/2016 | Park ...................... H04W 72/56 370/329 |
| 2016/0191258 | A1 | 6/2016 | Oyman |
| 2016/0337839 | A1 | 11/2016 | Chae |
| 2017/0041894 | A1 | 2/2017 | Lee |
| 2017/0099174 | A1 | 4/2017 | Kim |
| 2017/0265221 | A1 | 9/2017 | Yang |
| 2017/0295554 | A1 | 10/2017 | Lee |
| 2017/0347339 | A1 | 11/2017 | Yasukawa |
| 2017/0353936 | A1 | 12/2017 | Zhang |
| 2018/0098369 | A1 | 4/2018 | Yasukawa et al. |
| 2019/0014490 | A1 | 1/2019 | Kim |
| 2019/0045483 | A1 | 2/2019 | Tabet |
| 2019/0052436 | A1 | 2/2019 | Desai |
| 2019/0166607 | A1 | 5/2019 | Zhou |
| 2019/0230683 | A1* | 7/2019 | Akkarakaran ........ H04L 5/0053 |
| 2019/0253977 | A1 | 8/2019 | Wang et al. |
| 2020/0053743 | A1* | 2/2020 | Cheng .................. H04W 72/23 |
| 2020/0146010 | A1 | 5/2020 | Abdoli |
| 2021/0168574 | A1 | 6/2021 | Zhang |
| 2021/0176720 | A1 | 6/2021 | Chae |
| 2021/0204307 | A1 | 7/2021 | Lee et al. |
| 2021/0219269 | A1 | 7/2021 | Lee |
| 2021/0266922 | A1 | 8/2021 | Zhao et al. |

FOREIGN PATENT DOCUMENTS

| | | |
|---|---|---|
| CN | 108141847 | 6/2018 |
| CN | 113243137 | 8/2021 |
| CN | 119584316 A | 3/2025 |
| CN | 119629764 A | 3/2025 |
| EP | 2677671 | 12/2013 |
| EP | 3179789 | 6/2017 |
| EP | 3179789 A1 | 6/2017 |
| EP | 3895494 | 10/2021 |
| EP | 3895494 A1 | 10/2021 |
| IN | 202147031149 | 7/2021 |
| WO | 2017191917 | 11/2017 |
| WO | 2017191917 A1 | 11/2017 |
| WO | 2020119723 | 6/2020 |

OTHER PUBLICATIONS

Examination report for corresponding Indian Patent Application: 202147031149, issued on Mar. 9, 2022.
Extended European Search Report for corresponding European Patent Application No. 19895031.1., issued on Sep. 29, 2022.
Final Office Action for U.S. Appl. No. 16/710,666, issued on May 6, 2022.
Huawei, HiSilicon, "Sidelink physical layer structure for NR V2X", 3GPP TSG RAN WG1 Meeting #95 Spokane, USA, Nov. 12-16, 2018, R1-1812206.
International Preliminary Report on Patentability issued on Jun. 8, 2021 for International Patent Application No. PCT/CN2019/124581.
International Search Report issued on Mar. 10, 2020 for International Patent Application No. PCT/CN2019/124581.
Issue Notification for U.S. Appl. No. 16/710,666, issued on Oct. 5, 2022.
MCC Support: Draft Report of 3GPP TSG RAN WG1 #94bis v0.1.0 (Chengdu, China, 8-12, 2018, vol. RAN WG1,No. Spokane, USA; Nov. 12, 2018-Nov. 16, 2018; Retrieved from the Internet: URL:https://www.3gpp.org/ftp/tsg_ran/WG1_R L1/TSGR1_94b/Report [retrieved on Oct. 16, 2018] * Section 7.2.4.1 *.
Non-Final Office Action for U.S. Appl. No. 16/710,666, issued on Sep. 17, 2021.
Non-Final Office Action issued on May 27, 2023 for corresponding Chinese Patent Application No. 2019800826135.
Notice of Allowance for corresponding U.S. Appl. No. 16/710,666, issued on Oct. 18, 2022.
Search Report issued on May 27, 2023 for corresponding Chinese Patent Application No. 2019800826135.
Second Non-Final Office Action issued on Feb. 6, 2024 for corresponding Chinese Patent Application No. 2019800826135.
Second Non-Final Office Action issued on Feb. 6, 2024 for corresponding Chinese Patent Application No. 2019800826135. with English translation.
VIVO: "Physical layer procedure for an NR sidelink", Proceduree for NR Sidelink, 3rd Generation Partnership Project, 2018. vol. RAN WG1, No. Spokane, USA; Nov. 12, 2018-Nov. 16, 2018; URL: http://www.3gpp.org/ftp/Meetings%5F3GPP%5FSYNC/RAN1/Docs/R1%2D1812307%Ezip.
Written Opinion of the International Searching Authority issued on Mar. 10, 2020 for International Patent Applicatin No. PCT/CN2019/124581.
Rejection of previous rejection of Apr. 30, 2024, issued on Aug. 19, 2024 for corresponding Chinese Patent Application No. 201980082613.5.
English translation of Rejection of previous rejection of Apr. 30, 2024, issued on Aug. 19, 2024 for corresponding Chinese Patent Application No. 201980082613.5.
English Translation of Final Office Action issued on Apr. 30, 2024 by State Intellectual Property Office of Peoples Republic of China for corresponding Chinese Patent Application No. 201980082613.5.
Final Office Action issued on Apr. 30, 2024 by State Intellectual Property Office of Peoples Republic of China for corresponding Chinese Patent Application No. 201980082613.5.
Notice of Allowance issued on Oct. 28, 2024, for corresponding Chinese Patent Application No. 201980082613.5.
English translation of Notice of Allowance issued on Oct. 28, 2024, for corresponding Chinese Patent Application No. 201980082613.5.
Non-Final Office Action issued on Sep. 27, 2023 for corresponding U.S. Appl. No. 17/943,871.
Notice of Allowance issued on Jan. 25, 2024 for corresponding U.S. Appl. No. 17/943,871.
Supplemental Notice of Allowance issued on Mar. 5, 2024 for corresponding U.S. Appl. No. 17/943,871.
Issue Notification issued on Mar. 27, 2024 for corresponding U.S. Appl. No. 17/943,871.
The extended European search report is dated Sep. 29, 2022 received in EP 19895031.3.
VIVO: "Physical layer procedure for NR sidelink", 3GPP Draft; R1-1812307 Physical Layer Procedure for NR Sidelink, 3rd Generation Partnership Project (3GPP), Mobile Competence Centre, vol. Ran WG1, No. Spokane, USA; Nov. 16, 2018-Nov. 16, 2018 Nov. 11, 2018, XP051554212.
MCC Support: "Draft Report of 3GPP TSG RAN WG1 #94bis v0.1.0 (Chengdu, China, Oct. 8-12, 2018)", 3GPP Draft; Draft_Minutes_Report_RAN1#94B_V010, 3rd Generation Partnership Project (3GPP), Mobile Competence Centre ; 650, Route Des Lucioles ; F-06921 Sophia-Antipolis Cedex; France; vol. Ran WG1, No. Spokane, USA; Nov. 12, 2018-Nov. 16, 2018; Oct. 16, 2018 (Oct. 16, 2018), XP051519400, Retrieved from the Internet: URL :https ://www.3gpp.org/ftp/.

(56) References Cited

OTHER PUBLICATIONS

Communication under Rule 71(3) EPC mailed on Apr. 17, 2025 received in EP 19895031.3.

* cited by examiner

METHODS AND APPARATUSES FOR COLLISION CONTROL OF SIDELINK COMMUNICATIONS IN WIRELESS COMMUNICATION SYSTEM

CROSS-REFERENCE TO RELATED APPLICATION(S)

The present application is a continuation of U.S. patent application Ser. No. 17/943,871, now allowed, filed on Sep. 13, 2022, which is a continuation of U.S. patent application Ser. No. 16/710,666, filed Dec. 11, 2019, now issued as U.S. Pat. No. 11,483,782 on Oct. 25, 2022, which claims the benefit of and priority to a provisional U.S. Patent Application Ser. No. 62/779,597, filed on Dec. 14, 2018, the entire disclosures of which are hereby incorporated fully by reference into the present application.

FIELD

The present disclosure generally relates to wireless communications, and more particularly, to methods and apparatuses for collision control of sidelink communications in wireless communication systems.

BACKGROUND

Wireless communication systems may support direct communications between wireless communication devices (e.g., User Equipments (UEs)). Examples of direct communications include Device-to-Device (D2D) communications, Vehicle-to-Everything (V2X) communications, and the like. Direct communications may also be referred to as sidelink communications. Sidelink communications allow two or more wireless communication devices (e.g., UEs) to communicate with each other without the need of a base station (or any other intervening device).

However, collisions may happen when a wireless communication device is configured to perform transmissions or receptions on two or more physical sidelink channels at the same time. Therefore, there is a need in the art for providing methods and apparatuses for collision control of sidelink communications in wireless communication systems.

SUMMARY

The present disclosure is directed to methods and apparatuses for collision control of sidelink communications in wireless communication systems.

According to an aspect of the present disclosure, a wireless communication device is provided. The wireless communication device includes one or more non-transitory computer-readable media having computer-executable instructions embodied thereon and at least one processor coupled to the one or more non-transitory computer-readable media. The at least one processor is configured to execute the computer-executable instructions to determine whether to transmit a first Sidelink Synchronization Signal (SLSS) according to a priority parameter when an occasion of the first SLSS collides with a Physical Sidelink Feedback Channel (PSFCH) that carries Sidelink Feedback Control Information (SFCI). The priority parameter may be associated with a Physical Sidelink Shared Channel (PSSCH) that corresponds to the PSFCH.

According to another aspect of the present disclosure, a method performed by a wireless communication device is provided. The method includes determining whether to transmit a first SLSS according to a priority parameter when an occasion of the first SLSS collides with a PSFCH that carries SFCI. The priority parameter may be associated with a PSSCH that corresponds to the PSFCH.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
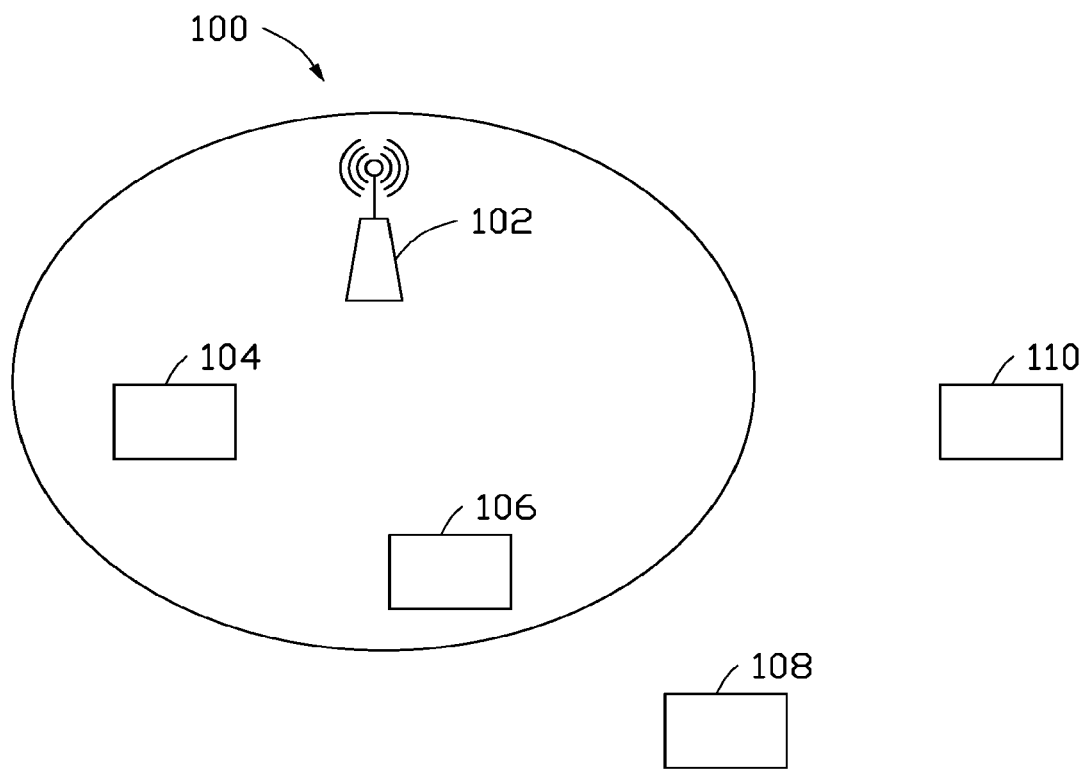
FIG. 1 illustrates a V2X wireless communication network 100, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one base station, at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR. (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects and represents that three relationships may exist. For example, A and/or B may indicate that: A exists alone, A and B exist at the same time, or B exists alone. In addition, the character "/" herein generally represents that the former and latter associated objects are in an "or" relationship.

FIG. 1 illustrates a V2X wireless communication network 100, in accordance with an example implementation of the present disclosure. As shown in FIG. 1, the V2X wireless communication network 100 may include base station 102 and several UEs 104, 106, 108 and 110. Some of the UEs (e.g., UEs 104 and 106) may be in the signal coverage area of base station 102, while other UEs (e.g., UEs 108 and 110) may be out of the signal coverage area. UEs 104 and 106 may communicate with base station 102 via downlink or uplink transmissions, and communicate with each other via sidelink transmissions. For example, UE 104 may transmit data and control information to UE 106 over a PSSCH and a Physical Sidelink Control Channel (PSCCH), respectively, and UE 106 may transmit data to UE 104 over a Physical Sidelink Feedback Channel (PSFCH). UE 104 and/or UE 106 may further communicate with the out-of-coverage UEs (e.g., UEs 108 and 110) via sidelink transmissions. UEs 108 and 110 may also perform sidelink transmissions to communicate with each other (and with UEs 104 and 106).

In some of the present implementations, a PSFCH may be used to carry Sidelink Feedback Control Information (SFCI). The PSFCH may be transmitted in a unicast or groupcast manner. The SFCI may include Hybrid Automatic Repeat Request (HARQ) information (e.g., Acknowledgement (ACK) or Negative-Acknowledgement (NACK)) for a PSSCH associated with the the PSFCH.

In some of the present implementations, a UE may transmit or receive one or more Sidelink Synchronization Signals (SLSSs) via a sidelink channel. The SLSS transmission may be triggered by a UE based on a channel condition. In some of the present implementations, the UE may transmit an SLSS when the UE finds that there is no valid synchronization source (e.g., a Global Navigation Satellite System (GNSS)). In some of the present implementations, the SLSS may be an LTE or NR V2X synchronization signal. In some of the present implementations, the SLSS may be a standalone reference signal, which may be included in a Sidelink-Synchronization Signal/Physical Broadcast Channel Block (S-SSB), or may be included in a sidelink channel that is used for sidelink synchronization (e.g., a reference signal that is provided in a sidelink over a PSSCH, a PSCCH, etc.). In addition, the UE may perform sidelink transmissions (e.g., SLSS transmissions) on multiple carriers/Bandwidth Parts (BWPs)/resource pools at the same time. Hence, the preconfigured (or configured) resource or channel for a synchronization signal may overlap another physical resource or channel. Moreover, different physical channels or physical signals for the same or different sessions or links may also overlap with each other. In such cases, a UE may decide to drop a portion of the physical signal(s) or physical channel(s) (e.g., if the UE only supports a half-duplex function, when the UE is not capable of transmitting and receiving data at the same time, when the UE is not capable of performing transmissions and receptions with different Subcarrier Spacings (SCSs) at the same time, etc.). Additionally, even operated in a single BWP/carrier/resource pool, the UE may be associated with (or connect to) multiple base stations (e.g., base stations that support V2X functions), or may perform the sidelink operations in a unicast and groupcast manner at the same time. In view of this, some of the present implementations provide a collision control mechanism for sidelink communications in wireless communication systems. It should be noted that the collision control mechanism may be applicable to those UEs engaged in unicast, broadcast or groupcast operations.

Figure 2:
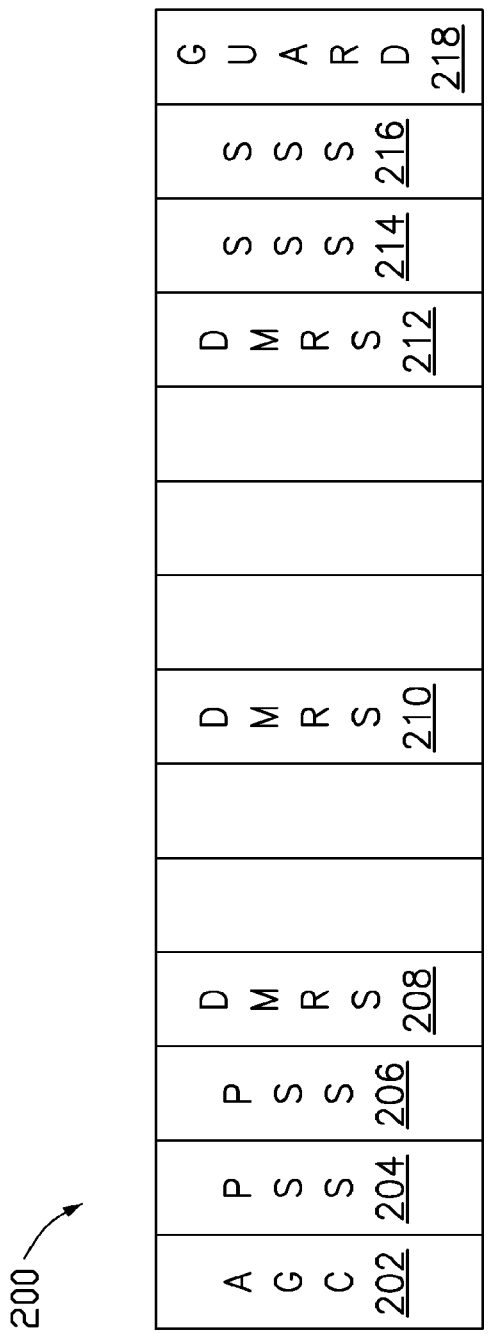
FIG. 2 illustrates an example SLSS format of an SLSS, in accordance with an example implementation of the present disclosure.

FIG. 2 illustrates an example SLSS format 200 of an SLSS, in accordance with an example implementation of the present disclosure. As shown in FIG. 2, the SLSS format 200 may include at least one Automatic Gain Control (AGC) symbol 202, several Primary Synchronization Signal (PSS) symbols 204 and 206, several Demodulation Reference Signal (DMRS) symbols 208, 210 and 212, several Secondary Synchronization Signal (SSS) symbols 214 and 216, and a guard symbol 218. In some of the present implementations, the SLSS format 200 may further include at least one Sidelink Physical Broadcast Channel (S-PBCH) symbol (not illustrated in the figure).

According to the Out-Of-Coverage (OOC) operations in the V2X wireless communication network, an OOC UE (e.g., UE 108 illustrated in FIG. 1) may act as a synchronization source to transmit SLSS(s) to another OOC UE (e.g., UE 110 illustrated in FIG. 1). In some of the present implementations, whether a UE transmits (e.g., on its own and without receiving an instruction, for example, from a base station) the SLSS(s) may depend on a Reference Signal Received Power (RSRP) value of an SLSS received from another synchronization source. For example, if the RSRP value is less than a threshold value, the UE may decide to transmit the SLSS(s) out to act as a synchronization source. The threshold value may be preconfigured (e.g., stored in the UE) or may be configured by the network (e.g., the base station). In some of the present implementations, the value of the threshold may be set as infinity so that the UE may always transmit out the SLSS(s). In some other implementations, the value of the threshold may be set as minus infinity so that the UE may never transmit the SLSS(s).

In some of the present implementations, a UE may turn on/off an SLSS transmission process according to a special indicator (e.g., an Information Element (IE), slss-TxDisabled, etc). The indicator may be a one-bit indicator which may be provided in Radio Resource Control (RRC) signaling or in a System Information Block (SIB).

In a V2X wireless communication network, a UE may be considered as a Receive UE (RX UE) when it is configured to receive scheduling information from another UE in one scheduling assignment, and may be considered as a Transmit UE (TX UE) when it is configured to transmit scheduling information to another UE (e.g., RX UE) in one scheduling assignment. The TX UE may be a scheduler UE (or a header UE) in a group. For those UEs in the same group, they may be assigned with the same group Identity (ID). The scheduler UE may be a Road Site Unit (RSU) or a vehicle that is responsible for handling scheduling of all the UEs in the group.

In some of the present implementations, the role of a UE to be a TX UE or an RX UE may be determined per a scheduling assignment. For example, an RX UE in a first group may also be a TX UE in a second group when the RX UE receives a scheduling assignment in the first group.

In some of the present implementations, an SLSS transmission configuration may include a one-bit indicator. For example, the UE may be configured to transmit the SLSS(s) when the indicator is set to "1," and not to transmit the SLSS(s) when the indicator is set to "0." It should be noted that an In-Coverage (IC) UE (e.g., UEs 104 and 106 illustrated in FIG. 1) may perform the mode 2 scheduling.

In some of the present implementations, the SLSS transmission configuration may be provided by a scheduler source device (e.g., a TX/scheduler/header UE in a group, a gNB, or an eNB) via Downlink Control Information (DCI), Sidelink Control Information (SCI), a Medium Access Control (MAC)-Control Element (MAC-CE) (e.g., from a PC5 or Uu interface), RRC signaling (e.g., from a PC5 or Uu interface), a SIB (from a PC5 or Uu interface), or a Master Information Block (MIB) (e.g., from a PC5 or Uu interface).

In some of the present implementations, whether to perform the SLSS transmissions (e.g., transmitting one or more SLSSs) may depend on the zone IDs of the RX UE and the scheduler source device. For example, if the difference between the values of the zone IDs of the RX UE and the scheduler source device is larger than a predefined/preconfigured/configured threshold, which implies that the RX UE may be far from the scheduler source device geographically, the RX UE may become a synchronization source and transmit the SLSS(s). Conversely, if the difference between the values of the zone IDs of the RX UE and the scheduler source device is less than, or equal to, the threshold, the RX UE may not transmit the SLSS(s). In some of the present implementations, the RX UE may consider both the zone ID and the received SLSS signal quality when determining whether to transmit the SLSS(s). For example, if the RSRP values of the received SLSSs from different scheduler source devices are similar, the RX UE may consider the difference of the values of the zone IDs to determine whether to transmit the SLSS(s).

In some of the present implementations, the zone ID of the RX UE may be derived from the geographical location (e.g., determined by a GNSS) of the RX UE, or the geographical-related information provided by the scheduler source device. In addition, the zone ID of the scheduler source device may be transmitted to the RX UE via DCI/SCI/MAC-CE (e.g., from the PC5 or Uu interface)/RRC (e.g., from the PC5 or Uu interface)/SIB (e.g., from the PC5 or Uu interface)/MIB (e.g., from the PC5 or Uu interface).

In some of the present implementations, once the RX UE receives multiple SLSS transmission configurations from different groups or clusters, the RX UE may transmit the SLSSs based on the received SLSS transmission configurations if the resource allocations for the SLSSs are not overlapped. Conversely, if some of the resource allocations for the SLSSs are partially, or entirely, overlapped, the RX UE may choose one of the SLSS transmission configurations to perform the SLSS transmission, and may drop the other received SLSS transmission configuration(s). The rule to choose the SLSS transmission configuration may be based on 1) the UE implementation, 2) the corresponding priority indicators of the SLSS transmission configurations, and/or 3) a default selection rule (e.g., transmitting the SLSS(s) based on the latest received SLSS transmission configuration). In some of the present implementations, the SLSS transmission configuration may be configured per a resource pool/BWP/carrier basis. The rule to choose the SLSS transmission configuration may be applied to the overlapped region between different resource pools/BWPs/carriers if these resource pools/BWPs/carriers are overlapped.

In some of the present implementations, a UE may not perform SLSS transmissions on a resource pool/BWP/carrier that is not associated with the UE.

In some of the present implementations, a UE may not perform SLSS transmissions if the UE is not a scheduler/header UE in a group/cluster. For example, the UE may be configured as a scheduler/header UE by higher layer signaling, such as Sidelink RRC (SL-RRC) signaling, RRC signaling, or PC5-S signaling. In some implementations, the UE may need to send a request to the scheduler/header UE in the group/cluster to join the group/cluster.

In some of the present implementations, a UE may start to perform SLSS transmissions if the UE becomes a scheduler/header UE in a group/cluster. It should be noted that a UE may become a scheduler/header UE because of the configuration of the network or the previous scheduler UE. For example, the SLSS transmission configuration may be mandatorily appended in a pre-configuration or an RRC configuration when a UE becomes a scheduler/header UE based on the configuration of the base station.

In some of the present implementations, an RX UE may receive a first SLSS transmission configuration and a second SLSS transmission configuration from a scheduler source device, where the content of the second SLSS transmission configuration may be different from that of the first SLSS transmission configuration. For example, the second SLSS transmission configuration may include a different TX power, a different time/frequency domain resource allocation, or a different time/frequency domain offset than the first SLSS transmission configuration. In this manner, an RX UE of a group, which may be in the middle/edge area of the group, may act as a synchronization source for the UEs that are outside the group, and meanwhile, the RX UE may avoid causing interferences with the other UEs inside the group. For example, when the RX UE is located in the middle (or on the edge) area of a group, the scheduler UE of the group may indicate to the RX UE to perform, based on the second SLSS transmission configuration, the SLSS transmissions for the UEs on the edge area of the group. On the other hand, the scheduler UE of the group may perform SLSS transmissions to the UEs inside the group based on the first SLSS transmission configuration. Thus, the interference with the SLSSs for the UEs outside/inside the group may be reduced.

In some of the present implementations, the RX UE may receive the first SLSS transmission configuration and the second SLSS transmission configuration from a first scheduler source device and a second scheduler source device, respectively. The first scheduler source device and the second scheduler source device may belong to a first group (or cluster) and a second group (or cluster), respectively. The RX UE may connect/belong to the first group and the second group at the same time. In some of the present implementations, as one of the SLSS transmission configurations (e.g., the first SLSS transmission configuration) is provided by the base station, the RX UE may ignore other SLSS transmission configurations (e.g., the second SLSS transmission configuration) if the resource allocation of the SLSS transmission configuration provided by the base station overlaps the resource allocation of the other SLSS transmission configurations.

In some of the present implementations, one or more SLSS IDs may be reserved for groupcast, so that the scheduler UE of a group (or a UE associated with the group)

may generate synchronization signals based on the reserved SLSS ID(s) for the group. In some of the present implementations, the SLSS ID of a UE may be derived from a group ID of a group to which the UE belongs. In some of the present implementations, the SLSS ID may be configured by the base station. For example, the UE may determine the corresponding SLSS ID by the following equation:

SLSS ID=mod(group ID, X)+Y, where X and Y may be default values, or values which are configured (or broadcasted) by the base station.

In some of the present implementations, an RX UE may determine whether the received Physical Sidelink Broadcast Channel (PSBCH)/SCI/PSCCH/PSSCH is provided the associated group/cluster based on the group ID by using, for example, the scrambling Cyclic Redundancy Check (CRC) bits or sequences. The group ID may be contained in the DCI/SCI/MAC-CE (e.g., from the PC5 or Uu)/RRC (e.g., from the PC5 or Uu)/SIB (e.g., from the PC5 or Uu)/MIB (e.g., from the PC5 or Uu).

As mentioned above, the SFCI may include the HARQ information and/or the Channel State Information (CSI) report sent from an RX UE to a TX UE. The SFCI may be transmitted over a dedicated channel such as a PSFCH. In some of the present implementations, the timing/frequency resource allocation for the SFCI may be dynamically indicated by the TX UE. In some of other implementations, the time offset between the timing/frequency resource for the SFCI and the time slot that the UE receives the SCI in the corresponding PSCCH may be fixed. However, in both SFCI resource allocation approaches, the SFCI resource (or PSFCH) may still collide with the resource for the SLSS transmission. Therefore, techniques are described herein for handling the collision between the PSFCH and the SLSS resource.

Figure 3A:
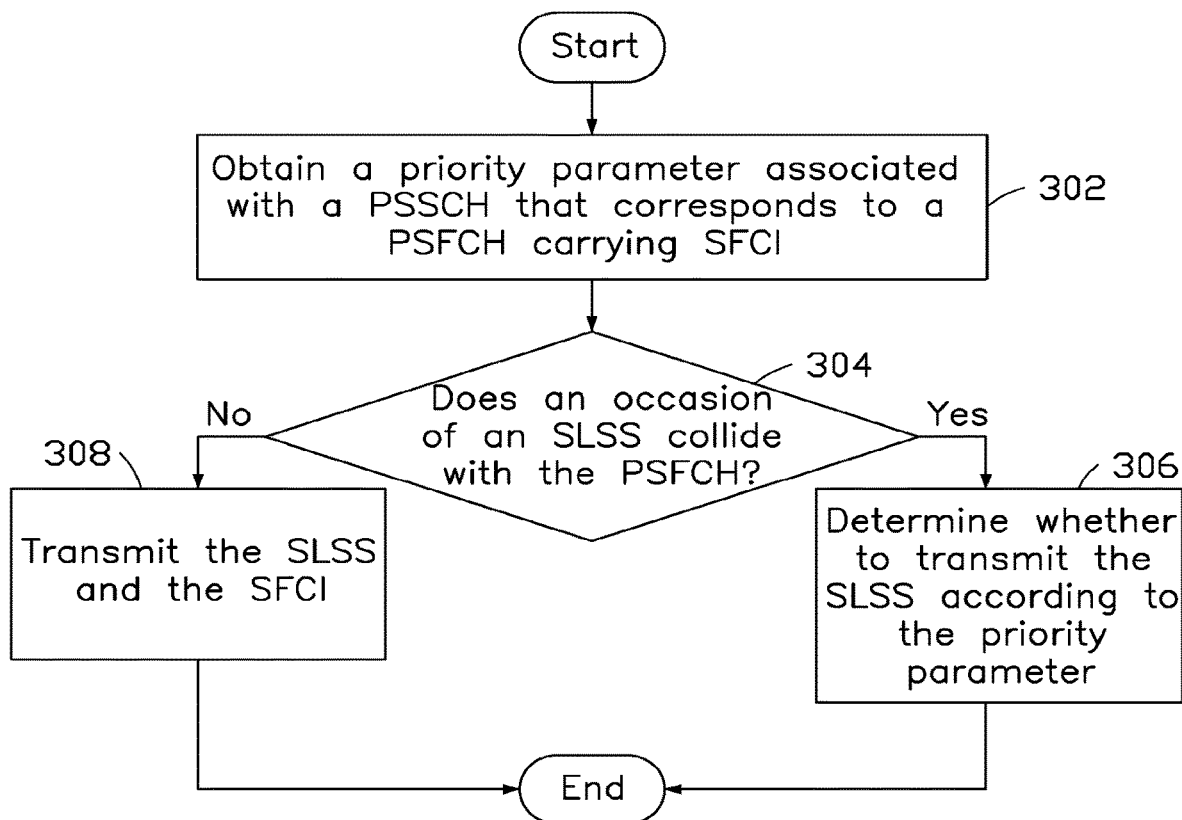
FIG. 3A is a flowchart for a method of handling collisions between a PSFCH and an SLSS, in accordance with an example implementation of the present disclosure.

FIG. 3A is a flowchart for a method of handling collisions between a PSFCH and an SLSS, in accordance with an example implementation of the present disclosure.

In action 302, a wireless communication device may obtain a priority parameter associated with a PSSCH that corresponds to a PSFCH carrying the SFCI. In some of the present implementations, the priority parameter may be a ProSe Per packet Priority (PPPP) parameter of the PSSCH or may be associated with (or derived from) one or more Quality of Service (QoS) parameters (e.g., latency-related parameters). In some of the present implementations, the priority parameter may be contained in the SCI carried on the PSSCH. In some of the present implementations, the wireless communication device may be a UE or a scheduler source device in a group.

In action 304, the wireless communication device may determine whether an occasion of the SLSS collide with the PSFCH. In some of the present implementations, the occasion of the SLSS and the PSFCH may be configured on different BWPs, different resource pools, and/or different carriers.

In some of the present implementations, the SLSS may be an LTE SLSS as illustrated in FIG. 2. In some of the present implementation, the SLSS may be an NR SLSS which may be transmitted within an S-SSB. In some of the present implementations, the SLSS may be an LTE SLSS, an LTE PBCH, an NR SLSS, an NR PBCH, or an NR SSB.

In some of the present implementations, the occasion of the SLSS may be determined to be colliding with the PSFCH when the occasion of the SLSS overlaps the PSFCH in at least one Orthogonal Frequency Division Multiplexing (OFDM) symbol in time domain. In some of the present implementations, the occasion of the SLSS may be determined to be colliding with the PSFCH when the occasion of the SLSS overlaps the PSFCH in at least one resource element. In some of the present implementations, if the wireless communication device is unable to perform transmissions with different SCSs at the same time, and/or unable to transmit/receive signals and channels with different beam/spatial filters at the same time, the occasion of the SLSS may be determined to be colliding with the PSFCH when at least part of the SLSS and the PSFCH are configured to be transmitted through multiple spatial filters at the same time (if the SLSS and the PSFCH correspond to separate spatial Quasi Co Location (QCL) assumptions or spatial filters). In some of the present implementations, the wireless communication device may transmit UE-capability information to the network or another wireless communication device to indicate the number of antenna panels and/or spatial domain filters it can use at the same time.

If the occasion of the SLSS collides with the PSFCH, in action 306, the wireless communication device may determine whether to transmit the SLSS according to the priority parameter.

For example, if the PSFCH corresponds to a higher priority PSSCH (e.g., low PPPP in the scheduling SCI) than the SLSS transmission, the wireless communication device may not transmit the SLSS. In some of the present implementations, the value of the priority parameter (which may also be referred to as a priority value) may map to a preset priority value that is configured for a PSCCH or a PSSCH. For example, the network may configure the SLSS with a priority value of "4," and configure the PSSCH with a priority value of "7" via RRC signaling. In this case, the priority value of the PSFCH may follow its corresponding PSSCH, and thus the PSFCH may have a lower priority than the SLSS (in a configuration where the lower the priority value, the higher the priority).

Conversely, if the occasion of the SLSS does not collide with the PSFCH, in action 308, the wireless communication device may transmit the SLSS and the SFCI in the PSFCH.

In some of the present implementations, the SLSS transmission configuration may include at least two signal quality thresholds (e.g., RSRP thresholds), where each signal quality threshold may be applied to a corresponding type of transmission (e.g., a groupcast transmission or a unicast transmission).

Figure 3B:
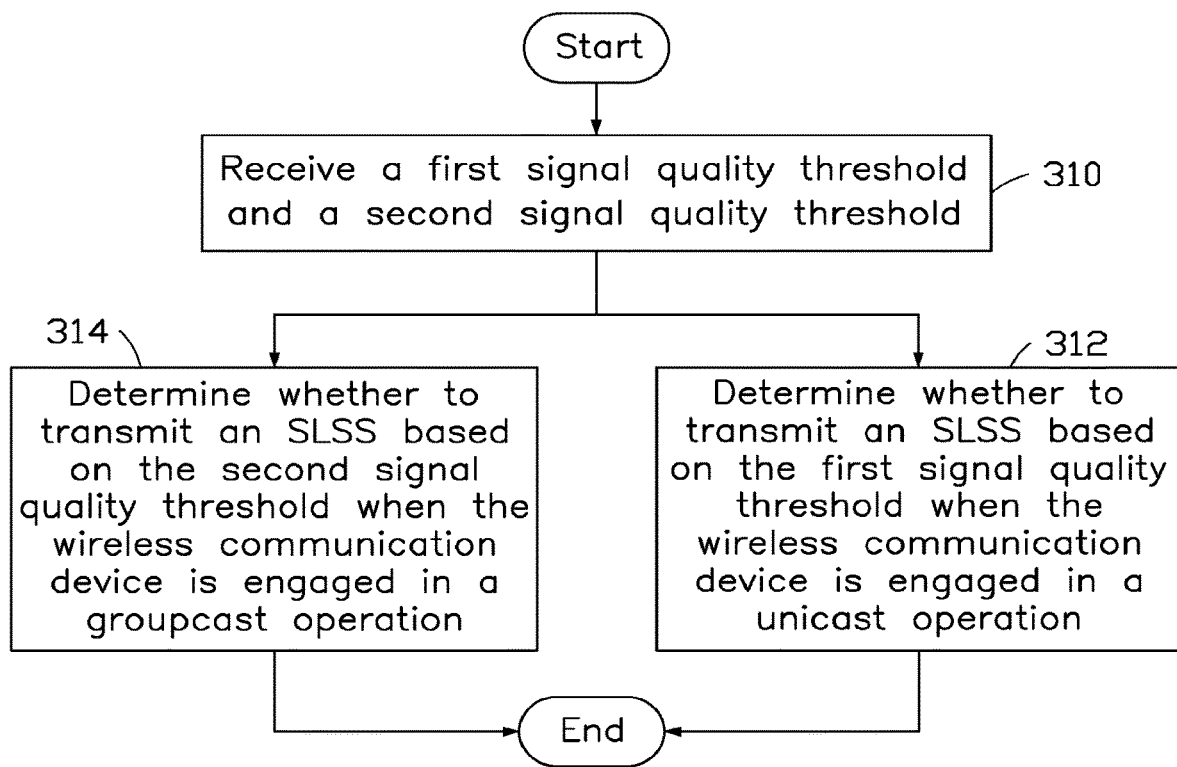
FIG. 3B is a flowchart for a method of handling collisions between a PSFCH and an SLSS, in accordance with an example implementation of the present disclosure.

FIG. 3B is a flowchart for a method of handling collisions between a PSFCH and an SLSS, in accordance with an example implementation of the present disclosure.

In action 310, a wireless communication device (e.g., a UE) may receive a first signal quality threshold and a second signal quality threshold from an SLSS transmission configuration.

In action 312, the wireless communication device may further determine whether to transmit an SLSS based on the first signal quality threshold when the wireless communication device is engaged in a unicast operation.

In action 314, the wireless communication device may determine whether to transmit an SLSS based on the second signal quality threshold when the wireless communication device is engaged in a groupcast operation.

For example, when an RX UE is engaged in an unicast operation, the RX UE may transmit the SLSS if the RSRP of a received SLSS is less than the first signal quality threshold, and not transmit the SLSS if the RSRP of the received SLSS is larger than, or equal to, the first signal quality threshold. On the other hand, when the RX UE is engaged in a groupcast operation, the RX UE may transmit the SLSS if the RSRP of a received SLSS is less than the second signal quality threshold, and not transmit the SLSS if the RSRP of the received SLSS is larger than, or equal to, the second signal quality threshold.

Figure 4:
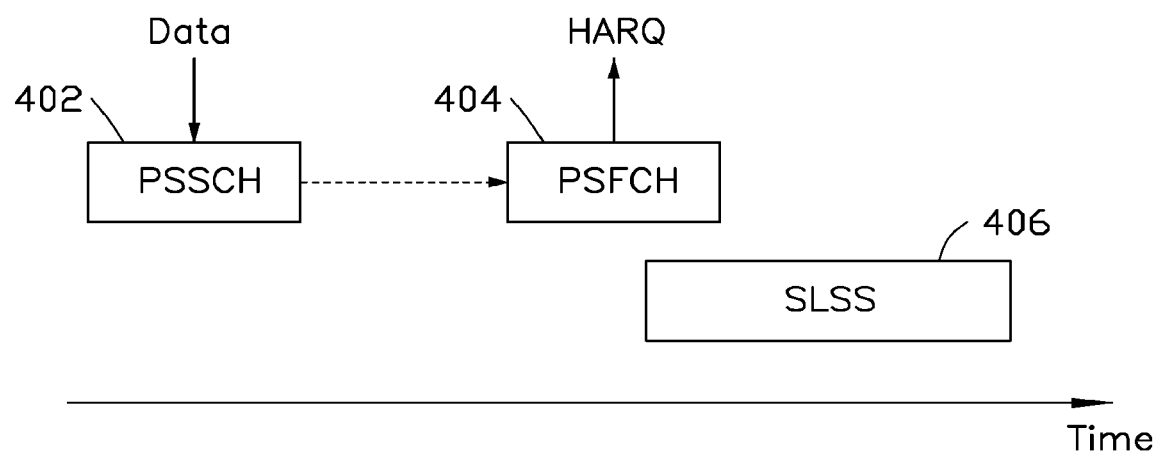
FIG. 4 is a schematic diagram illustrating a PSFCH colliding with an occasion of the SLSS, in accordance with an example implementation of the present disclosure.

FIG. 4 is a schematic diagram illustrating a PSFCH colliding with an occasion of the SLSS, in accordance with an example implementation of the present disclosure. As shown in FIG. 4, the ULE may receive data in PSSCH 402, and transmit the corresponding HARQ feedback (SFCI) in PSFCH 404. The HARQ feedback may be an ACK or NACK to indicate that whether the reception of the data in PSSCH 402 is successful. In this sense, PSFCH 404 may be considered as being associated with (or corresponding to) PSSCH 402.

In the example implementation, the occasion 406 of the SLSS collides with the PSSCH 402 because at least part of the occasion 406 overlaps with PSFCH 404 in the time domain. In this case, the UE may, for example, apply the method illustrated in FIG. 3 to handle the collision. For example, if PSFCH 404 corresponds to a higher priority than the SLSS transmission in the occasion 406, the UE may decide to transmit the HARQ feedback in PSFCH 404 instead of performing the SLSS transmission in the occasion 406.

In some of the present implementations, a UE may not transmit the SLSS by default when the occasion of the SLSS collides with the PSFCH. In this case, the PSFCH may correspond to a higher priority (e.g., corresponding to a high priority PSSCH) than the SLSS transmission.

In some of the present implementations, the SLSS resource (or occasion) of a first UE may collides with the PSFCH of a second UE. In this case, the first UE may determine whether to the SLSS based on the corresponding priority of the SLSS resource and the PSFCH. For example, if the PSFCH of the second UE corresponds to a higher priority than the SLSS resource, the first UE may decide not to transmit the SLSS when the collision happens. In some of the present implementations, the first UE and the second UE may belong to the same group, and the first UE may know where the second UE may transmit the SFCI.

In some of the present implementations, a UE may not transmit the SFCI over the PSFCH by default when the occasion of the SLSS collides with the PSFCH. In this case, the PSFCH may correspond to a lower priority (e.g., corresponding to a low priority PSSCH) than the SLSS transmission.

In some of the present implementations, whether to transmit an SFCI in a PSFCH when the occasion of an SLSS collides with the PSFCH may depend on the type of synchronization source that is configured to transmit the SLSS. For example, if a synchronization source configured to transmit the SLSS has a higher priority than an RX UE, the RX UE may decide to drop the SFCI transmission. The synchronization source may be, for example, a scheduler/header UE of the RX UE, or a base station.

In some of the present implementations, the priority parameter may be provided by a scheduler/header UE, a TX UE, or a base station in a group via DCI/SCI/MAC-CE (e.g., from the PC5 or Uu)/RRC (e.g., from the PC5 or Uu)/SIB (e.g., from the PC5 or Uu)/MIB (e.g., from the PC5 or Uu).

In some of the present implementations, a UE may choose another resource to transmit the SFCI if the original resource for the SFCI collides with the occasion of the SLSS. In some of the present implementations, the original resource for the SFCI may be configured or indicated by the TX UE. In some of other implementations, the original resource for the SFCI may have a fixed time/frequency offset to the end of the corresponding PSSCH/PSCCH. The other resource that the UE selects to transmit the SFCI when the collision happens may have a time/frequency offset (e.g., X slots, where X is a positive integer) from the original resource. The time/frequency offset may be preconfigured in the UE or dynamically configured by the network.

In some of the present implementations, a UE may choose another resource to transmit the SFCI if the original resource for the SFCI collides with the occasion of an SLSS, and the priority of the SLSS transmission is higher than the SFCI transmission (e.g., the SLSS transmission is associated with (or to be performed by) a synchronization source).

In some of the present implementations, a UE-capability-related indicator may be used to indicate whether a UE is able to perform transmissions and/or receptions simultaneously with the same or different numerologies in the same or different frequency carriers. If the UE is indicated as having the capability to transmit multiple signals at the same time over different channels (e.g., including the SLSS and the SFCI) with the same or different numerologies in a frequency band, neither of the SLSS transmission and the SFCI transmission may be dropped when the collision happens.

In some of the present implementations, the UE-capability-related indicator may be used to indicate whether a UE is able to simultaneously perform transmissions and/or receptions on different SCSs, different resource pools, different BWPs, or different carriers.

In some of the present implementations, a UE may conduct a power control process to adjust the TX power if the total TX power for the SLSS transmission and the PSFCH transmission exceeds a power threshold. In addition, the TX power for a reference signal that is associated with the PSFCH (e.g., a Sounding Reference Signal (SRS)/CSI-Reference Signal (CSI-RS)/DMRS) may also be adjusted according to the TX power for the PSFCH.

In some of the present implementations, the collision control process for the SLSS may also be applied to the collision with other reference signals, such as the Phase Tracking Reference Signal (PT-RS), the SRS, the CSI-RS, the AGC symbol/signal, the TX/RX switching symbol (guard symbol), and the DM-RS.

In some of the present implementations, since the SFCI is transmitted in a dedicated PSFCH, the PSFCH transmission may collide with a PSSCH, a PSCCH, or another PSFCH on the same or different carriers/BWPs/resource pools. In view of this, some of the present implementations provide methods to handle the collision between a first physical channel and a second physical channel. The first physical channel may be a PSFCH, and the second physical channel may be a PSSCH, a PSCCH, or another PSFCH. The first physical channel and the second physical channel may be associated with the same or different target devices. For example, a first PSFCH and a PSCCH/PSSCH/second PSFCH which are collided with each other may be configured to be transmitted to the same UE. For example, there may be a HARQ feedback scheduled to use the same resource as the previous HARQ feedback due to a fixed offset or latency requirement.

Similar to the PSFCH-SLSS collision case, the UE may determine that the first physical channel collides with the second physical channel when the two physical channels overlap with each other in at least one OFDM symbol or in at least one resource element, or when the UE is unable to apply different SCSs for the two physical channels at the same time, or when the UE is unable to transmit/receive the two physical channels at the same time.

The UE may determine whether to transmit the first/second physical channel based on certain priority rules when the collision happens. The priority rules for the PSFCH- SLSS collision case mentioned above may be also applicable for a collision between any two physical channels. For example, the UE may determine whether to transmit the first/second physical channel based on default settings (e.g., always dropping the transmission for the first or second physical channel), priority parameters, the type of the target device, the UE's capability, etc.

For example, if the PPPP value of a PSSCH/PSCCH is lower than a predefined/preconfigured/configured threshold (which means the PSSCH/PSCCH has a high priority for transmission), the UE may drop the PSFCH transmission, but perform the PSSCH/PSCCH transmission when the PSFCH collides with the PSSCH/PSCCH. Conversely, if the PPPP value of the PSSCH/PSCCH transmission is higher than the threshold, the UE may decide to drop the PSSCH/PSCCH transmission and transmit the SFCI over the PSFCH.

In some of the present implementations, if the PSSCH/PSCCH contains information/indicator related to the discovery procedure, the PSSCH/PSCCH may be considered as a high priority transmission. For example, if the PSCCH contains a discovery indicator which indicates that the associated PSSCH contains a discovery message, the UE may drop the PSFCH transmission, but transmit the PSSCH/PSCCH when the PSSCH/PSCCH collides with the PSFCH.

In some of the present implementations, if the target device for the PSFCH is a base station, the SFCI on the PSFCH may be given a high priority for transmission. For example, when a first PSFCH collides with a PSSCH/PSCCH/second PSFCH, the UE may not transmit the PSSCH/PSCCH/second PSFCH, but transmit the first PSFCH to the base station, if the first PSFCH contains a HARQ feedback to the base station.

In some of the present implementations, more than one SFCI resource may be configured in the same PSFCH. The UE may decide which of the SFCI resources on the PSFCH to transmit based on the content in the respective SFCI resources if some of the SFCI resource occasions overlap with each other. In some of the present implementations, an SFCI resource carrying a HARQ feedback may be given a higher priority for transmission. For example, if a UE needs to transmit the HARQ feedback in a first PSFCH to a first target device, and also needs to transmit CSI information in a second PSFCH to a second target device, the UE may drop the second PSFCH transmission, but may only transmit the first PSFCH if the first PSFCH collides with the second PSFCH.

In some of other implementations, an SFCI resource carrying the CSI information may be given a higher priority for transmission. The CSI information may include at least one of the CSI-RS Resource Indicator (CRI), the SLSS index, the Layer Indicator (LI), the Precoding Matrix Indicator (PMI), the Channel Quality Indicator (CQI), the RSRP, the Signal to Interference plus Noise Ratio (SINR), the Rank Indicator (RI), and other information related to the CSI.

Figure 5A:
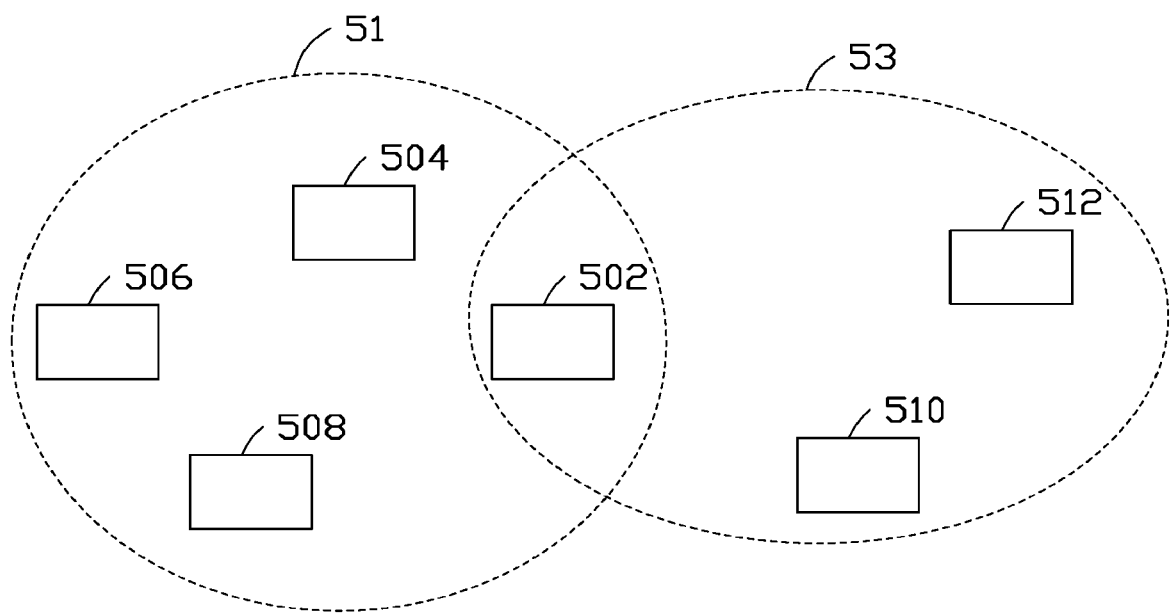
FIG. 5A is a schematic diagram illustrating a UE belonging to different groups, in accordance with an example implementation of the present disclosure.

FIG. 5A is a schematic diagram illustrating a UE belonging to different groups, in accordance with an example implementation of the present disclosure. As shown in FIG. 5, UE 502 belongs to group 51 and group 53 at the same time. In addition to UE 502, group 51 further includes UEs 504, 506 and 508, and group 53 further includes UEs 512 and 510. UEs in the same group may have the same group ID. For example, UE 504 may have the same group ID as UEs 506, 508 and 502, which are in the same group 51. In addition, a UE may transmit signals/channels to other UEs in the same group by group casting.

Figure 5B:
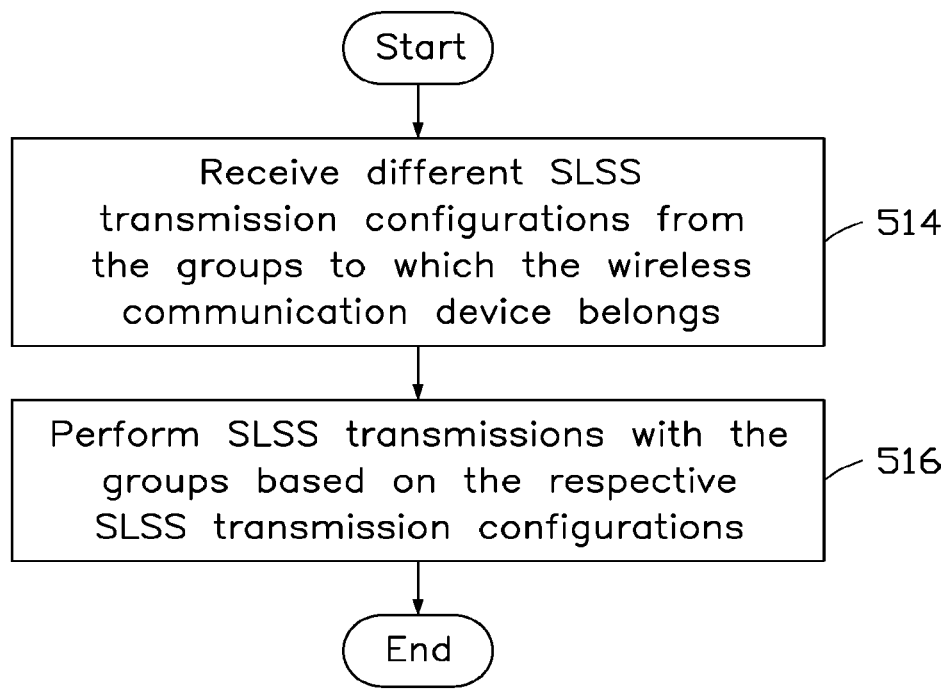
FIG. 5B is a flowchart for a method of a wireless communication device performing SLSS transmissions with different groups, in accordance with an example implementation of the present disclosure.

FIG. 5B is a flowchart for a method of a wireless communication device performing SLSS transmissions with different groups, in accordance with an example implementation of the present disclosure. In action 514, the wireless communication device (e.g., a UE) that belongs to different groups at the same time may receive different SLSS transmission configurations from the groups. In action 516, The wireless communication device may perform SLSS transmissions with the groups based on the respective SLSS transmission configurations.

For example, in FIG. 5A, UE 502 may receive a first SLSS transmission configuration from a first scheduler UE (e.g., UE 504) in group 51, and receive a second SLSS transmission configuration from a second scheduler UE (e.g., UE 510) in group 53. UE 502 may perform SLSS transmissions with UEs 504, 506 and 508 in group 51 based on the first SLSS transmission configuration, and may perform SLSS transmissions with UEs 510 and 512 in group 53 based on the second SLSS transmission configuration. In some of the present implementations, the first SLSS transmission configuration and the second SLSS transmission configuration may be different from each other in, for example, at least one of the TX power, the time-domain SLSS resource allocation, and the frequency-domain SLSS resource allocation. Thus, UE 502 may apply different SLSS transmission schemes to communicate with the UEs in the respective associated groups 51 and 53.

Figure 6:
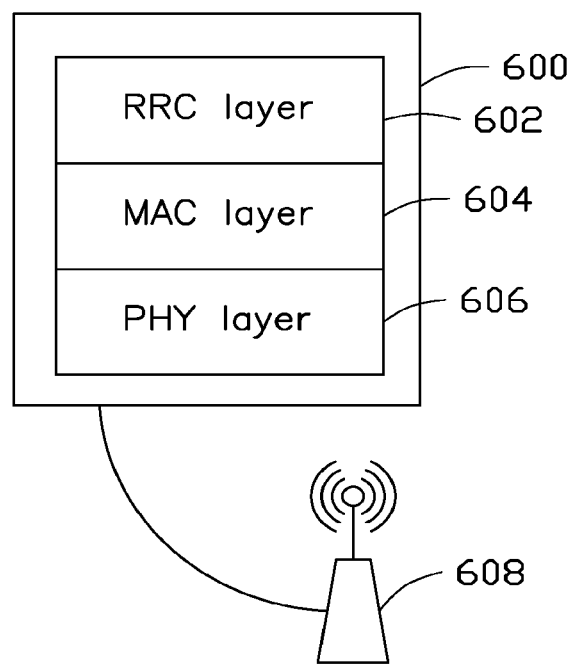
FIG. 6 is a schematic diagram illustrating an example architecture of a base station, in accordance with an example implementation of the present disclosure.

FIG. 6 is a schematic diagram illustrating an example architecture of a base station, in accordance with an example implementation of the present disclosure. As shown in FIG. 6, base station 600 may include a protocol stack that contains a few of protocol layers (e.g., RRC layer 602, MAC layer 604, and Physical (PHY) layer 606). Base station 600 may control and coordinate the activities of the various protocol layers of the protocol stack. In addition, PHY layer 606 may be coupled to at least one Transmit/Receive Point (TRP) 608. TRP 608 may be a macro-cell, a small-cell, a pico-cell, a femto-cell, a Remote Radio Head (RRH), a relay node, or a combination of antenna panels, which may be deployed anywhere, such as in the interior of a room, in/on a building, on top of a house or streetlamps, etc.

Figure 7:
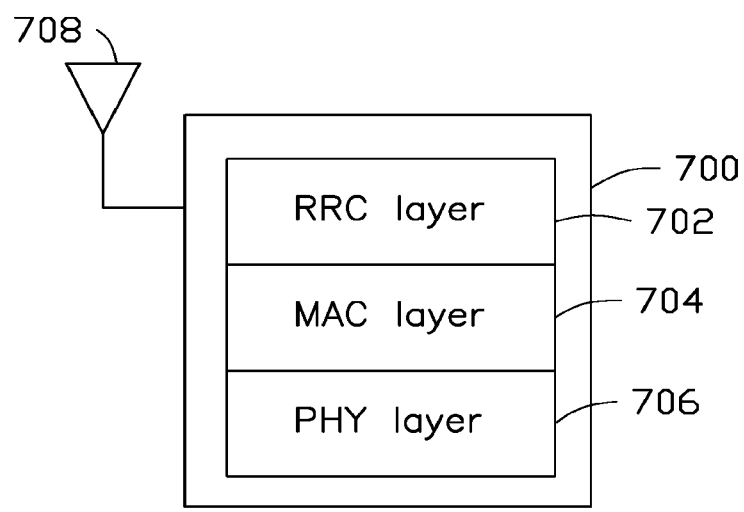
FIG. 7 is a schematic diagram illustrating an example architecture of a UE, in accordance with an example implementation of the present disclosure.

FIG. 7 is a schematic diagram illustrating an example architecture of a UE, in accordance with an example implementation of the present disclosure. As shown in FIG. 7, UE 700 may include a protocol stack that contains a few of protocol layers (e.g., RRC layer 702, MAC layer 704, and PHY layer 706). PHY layer 706 may be coupled to at least one Transmit (TX)/Receive (RX) antenna component 708 for transmitting and receiving signals. UE 700 may control and coordinate the activities of the various protocol layers of the protocol stack. For example, UE 700 may set and coordinate PHY layer 706, MAC layer 704, and RRC layer 702 based on the received signals from TX/RX antenna component 708. UE 700 may also set one or more TX parameters for TX/RX antenna component 708 based on the input signal(s).

Figure 8:
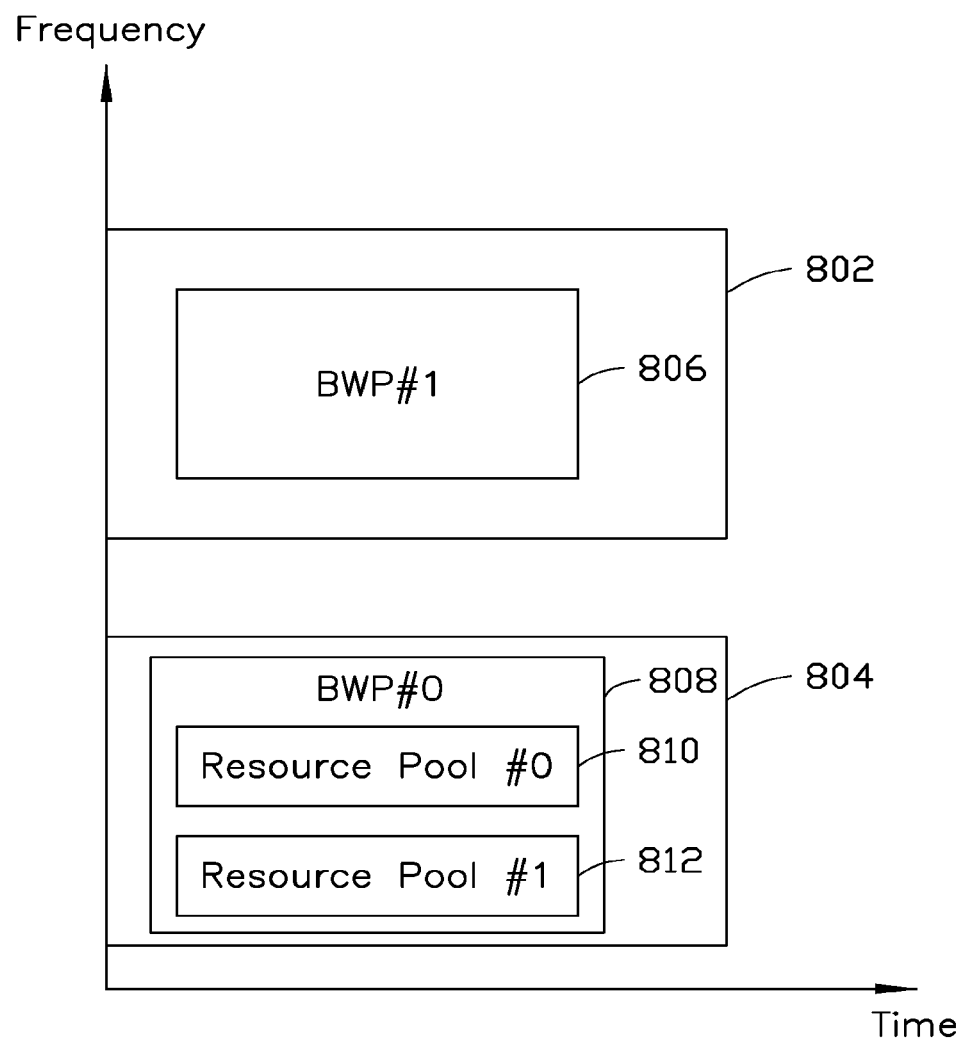
FIG. 8 is a schematic diagram illustrating a few of BWPs configured in different Component Carriers (CCs), in accordance with an example implementation of the present disclosure.

FIG. 8 is a schematic diagram illustrating a number of BWPs configured in different Component Carriers (CCs), in accordance with an example implementation of the present disclosure. As shown in FIG. 8, CC #1 802 includes BWP #1 806, and CC #0 804 includes BWP #0 808 that contains resource pool #0 810 and resource pool #1 812.

For ease of understanding, the time/frequency resources shown in FIG. 8 are illustrated with reference to the V2X wireless communication network 100 shown in FIG. 1. For example, UEs 104, 106, 108 and 110 may perform transmissions and receptions in CC #0 804. BWP #0 808 is an operating/active BWP suitable for sidelink transmissions and receptions. Each UE may perform transmissions or receptions on BWP #0 808 based on the scheduling information provided by other UEs (e.g., the TX UE or the scheduler/header UE) or the base station (e.g., base station 102). In addition, UE 104 and UE 106 belong to the same group, and UE 108 and UE 110 belong to another group. UE 106 may also perform transmission or establish a session on CC #1 804 and BWP #1 806.

In some of the implementations, UE 104 may act as a TX UE to transmit the scheduling information through a PSCCH for groupcasting to indicate to UE 106 (e.g., an RX UE in the same group) to receive data on the corresponding PSSCH on resource pool #0 810.

Since UE 104 and UE 106 are in the same group, the CRC of the PSCCH for groupcasting may be scrambled by a Radio Network Temporary Identifier (RNTI) for groupcasting. In some other implementations, the CRC of the PSCCH for groupcasting may not be scrambled by the RNTI for groupcasting, but the ID for groupcasting may be contained in the SCI.

After UE 106 receives, and successfully decodes, the PSCCH from UE 104, UE 106 may decide not to perform SLSS transmissions on resource pool #0 810, BWP #0 808, or CC #0 804 if an SLSS transmission indicator contained in the SCI of the decoded PSCCH indicates a particular value (e.g., "0"), even if the RSRP value of an SLSS received from resource pool #0 810, BWP #0 808, or CC #0 804 by UE 106 is less than a threshold. The threshold may be provided by base station 102 through broadcasting system information.

In some of the present implementations, the SLSS transmission indicator may be a threshold of an RSRP value (or an index for a value range). For example, if the SLSS transmission indicator indicates an RSRP value of "−100 dBm," UE 106 may perform SLSS transmissions when the RSRP of a received SLSS is less than −100 dBm.

In some of the present implementations, UE 106 may determine whether to perform SLSS transmissions based on the difference between the zone ID of UE 106 and the zone ID of UE 104. If the zone ID difference is larger than, or equal to, a threshold, UE 106 may decide not to perform SLSS transmissions, even if the RSRP of an SLSS measured by UE 106 is less than the threshold. The threshold may be provided by base station 102 through, for example, broadcasting system information.

In some of the other implementations, even if the difference between the zone IDs is less than the threshold, UE 106 may also check the received signal quality from UE 104 (e.g., the RSRP of an SLSS from UE 104). If the received signal quality from UE 104 is less than the threshold, UE 106 may still perform the SLSS transmissions.

In some of the present implementations, UE 106 may perform unicast transmission with UE 108 on resource pool #1 812, and UE 104 may transmit a zone ID or an SLSS transmission indicator to UE 106. After receiving the zone ID or the SLSS transmission indicator from UE 104, UE 106 may decide not to perform SLSS transmissions on resource pool #1 812, even if the signal quality of the SLSS measured on resource pool #1 812 is below a threshold.

In some of the present implementations, UE 106 may perform unicast transmissions with UE 108 on CC #1 804 or BWP #1 806. UE 104 may transmit a zone ID or an SLSS transmission indicator to UE 106. If the zone ID or the SLSS transmission indicator satisfies certain conditions (e.g., the difference between the zone ID of UE 104 and the zone ID of UE 106 is larger than a threshold), UE 106 may decide not to perform SLSS transmissions on CC #1 804 or BWP #1 806, even if the signal quality of an SLSS on CC #1 804 or BWP #1 806 is less than a signal quality threshold.

In some of the present implementations, UE 104 may act as a scheduler/header in the group because of the configuration of base station 102. In some of other implementations, UE 104 may notify base station 102 of UE 104 being volunteered to be the scheduler/header UE in the group, and then base station 102 may configure UE 104 as the scheduler/header UE. Once UE 104 becomes the scheduler/header UE in the group, it may perform SLSS transmissions on CC #0 804, BWP #0 808, or resource pool #0 810, even if the RSRP of an SLSS transmitted by UE 106 is higher than a threshold configured by base station 102 (e.g., via broadcasting system information).

In some of the present implementations, if UE 104 and UE 106 are a scheduler/header UE and an RX UE, respectively, in the group, UE 106 may not perform SLSS transmissions even if the RSRP of an SLSS measured by UE 106 is lower than a threshold configured by base station 102 (e.g., via broadcasting system information).

In some of the present implementations, UE 104 may transmit a resource allocation of an SLSS transmission to UE 106 through a PSCCH to inform UE 106 of the resource location of the SLSS transmission, so as to prevent UE 106 from performing SLSS transmissions in the same resource location as UE 104. For example, UE 106 may perform SLSS transmissions based on a first SLSS resource configuration of UE 104 and a second SLSS resource configuration, where the first SLSS resource configuration and the second SLSS resource configuration may have different resource allocations for SLSS transmissions. For example, UE 106 may perform SLSS transmissions on a resource indicated by the second SLSS resource configuration to avoid the collision of SLSS transmissions.

In some of the present implementations, at least one timing offset indicator (e.g., similar to syncOffsetIndicator IE) may be used to inform a UE (e.g., UE 106) a timing offset between a first SLSS transmission (e.g., configured by the first SLSS transmission configuration) and a second SLSS transmission (e.g., configured by the second SLSS transmission configuration). The timing offset indicator may be transmitted through, for example, the SCI.

In some of the present implementations, UE 104 may transmit a TX power configuration/indication of an SLSS transmission to UE 106 through a PSCCH to inform UE 106 of the TX power for the SLSS transmission.

In some of the present implementations, the SLSS transmission information/resource allocation information/zone ID may be transmitted from ULE 104 to UE 106 through a MAC-CE. The PSSCH that transmits the MAC-CE may be scheduled by the PSCCH for groupcasting.

In some of the present implementations, the SLSS transmission information/resource allocation information/zone ID may be transmitted from UE 104 to UE 106 through RRC signaling by unicasting/groupcasting/broadcasting. The PSSCH to transmit the RRC signaling may be scheduled by the PSCCH for groupcasting. One or more IEs may be provided in the RRC signaling to indicate an SLSS transmission configuration/RSRP threshold/indicator to help UE 106 determine whether to perform SLSS transmissions.

In some of the present implementations, the SLSS transmission information/resource allocation information/zone ID may be transmitted from base station 102 to UE 106 through the RRC signaling/MAC-CE/DCI/system information by unicasting/groupcasting/broadcasting. One or more IEs may be provided in the RRC signaling/MAC-CE/DCI/system information to indicate an SLSS transmission configuration/RSRP threshold/indicator to help UE 106 determine whether to perform SLSS transmissions.

In some of the present implementations, UE 104 and UE 106 may perform a unicast V2X communication.

In some of the present implementations, it is assumed that UE 104 is the scheduler UE of a group #1 and UE 108 is the scheduler UE of a group #2, and only the scheduler UE within a group can transmit the SLSS(s). In this case, if the SLSS ID #n to the SLSS ID #n+20 are reserved for the scheduler UE for groupcasting, UE 104 and UE 108 may select an SLSS ID from the reserved SLSS IDs based on an IC/OOC indicator (e.g., contained in SL-MIB) to generate the SLSS(s).

In some of the present implementations, UE 104 may be a TX UE that transmits the scheduling information to UE 106 (e.g., acting as an RX UE) through a PSCCH for groupcasting to indicate UE 106 to receive data on the corresponding PSSCH on resource pool #0 810. Once UE 106 receives data on the PSSCH successfully, UE 106 may be indicated to transmit the corresponding SFCI (e.g., including at least one of a HARQ feedback and a CSI report) to UE 104 on a resource in the slot #n+4 (if the end of the PSSCH is in the slot #n). If UE 106 is also configured/indicated to transmit the SLSS(s) on the same slot #n+4 (e.g., based on the RRC signaling from base station 102), the resource for the SFCI transmission may overlap with the resource for the SLSS transmission in at least one resource element. In this case, UE 106 may determine whether to perform the SLSS transmission in the slot #n+4 based on the priority rules mentioned above. For example, UE 106 may transmit the SFCI and not transmit the SLSS(s) in the slot #n+4. For example, UE 106 may transmit the SLSS(s) and not transmit the SFCI in the slot #n+4. For example, UE 106 may transmit the SFCI and drop the SLSS transmission in the slot #n+4 if the PPPP value of the PSSCH corresponding to the SFCI is lower than a threshold. The PPPP value may be contained in the PSCCH that schedules the PSSCH.

In some of the present implementations, if the NACK-only HARQ feedback mechanism is applied, UE 106 may not need to send a HARQ feedback to UE 104 if UE 106 has received data on the PSSCH successfully in the slot #n. However, UE 106 may know that there are some other UEs in the same group and those UEs may need to transmit a HARQ feedback to UE 104 in the slot #n+4 (e.g., based on the information from the scheduler/header UE or other UEs in the same group). Hence, UE 106 may not perform SLSS transmissions in the slot #n+4 either, even if UE 106 is configured/indicated to transmit SLSS(s) in the slot #n+4.

In some of the present implementations, UE 106 may determine whether to perform the SLSS transmissions based on whether the PSSCH corresponding to the HARQ feedback (e.g., contained in the SFCI) is a high reliability transmission. For example, if UE 106 receives data on the PSSCH in the slot #n, and the corresponding HARQ feedback is configured to be transmitted in the slot #n+4, UE 106 may decide to transmit the HARQ feedback in the slot #n+4 and drop the SLSS transmission on the same slot if the PSSCH is a high reliability transmission. In some of the present implementations, the PSSCH may be configured as a high reliability transmission because the PSSCH is a repetitive transmission, or the PSSCH is scheduled by the SCI transmitted in a repetitive resource or a PSCCH, or the PSSCH is scheduled by the SCI with an aggregation level for high reliability, or the PSSCH is scheduled by the SCI with a reliability indicator/order.

In some of the present implementations, UE 106 may decide whether to transmit the SLSS(s) based on a latency requirement indicator for a PSSCH. For example, if UE 106 receives data on the PSSCH in the slot #n, and the corresponding HARQ feedback is configured to be transmitted in the slot #n+4, UE 106 may decide to transmit the HARQ feedback in the slot #n+4 and drop the SLSS transmission on the same slot if the latency requirement indicator is less than a threshold. In some of the present implementations, the latency requirement indicator may be contained in the PSCCH that schedules the PSSCH. The latency requirement indicator may be configured by UE 104 via the PC5 RRC signaling or configured by base station 102 via the Uu RRC signaling. For example, UE 106 may receive a PSSCH-latencybudget-indicator (e.g., a latency requirement indicator) from UE 104 through the RRC signaling. UE 106 may compare the value of the PSSCH-latencybudget-indicator with a predefined threshold to decide whether to drop the HARQ feedback transmission. In some of the present implementations, if UE 106 is connected to more than one group, UE 106 may decide whether to perform the SLSS transmissions or the SFCI transmissions based on the latency requirement indicators configured for the respective groups.

In some of the present implementations, assuming that UE 106 knows that UE 108 is the scheduler UE for the group #1 and UE 108 may perform SLSS transmissions in the slot #n+4, UE 106 may decide not to transmit the SFCI on the same slot #n+4 if at least one resource element for the SFCI overlaps with the SLSS transmissions of UE 108.

In some of the present implementations, assuming that UE 106 knows that base station 102 may perform SLSS transmissions in the slot #n+4, UE 106 may decide not to transmit the SFCI in the same slot #n+4, if at least one OFDM symbol overlaps with the SLSS transmissions of base station 102.

In some of the present implementations, assuming that UE 106 knows that UE 104 may perform SLSS transmissions in slot #n+4, UE 106 may decide not to transmit the SFCI on the same slot #n+4 if at least one OFDM symbol overlaps with the SLSS transmissions of UE 104.

In some of the present implementations, the timing offset between the PSSCH and the resource of the corresponding HARQ feedback may be K slots, where K is a positive integer. In some of the present implementations, the value K may be dynamically configured or indicated by UE 104 through the SCI in the PSCCH.

In some of the present implementations, UE 106 may shift the resource of the SFCI transmission to another slot (e.g., shifting from the slot #n+4 to the slot #n+5) if the original resource of the SFCI transmission overlaps with the resource of the SLSS transmission.

As mentioned above, UE 104 may be the TX UE and UE 106 may be the RX UE in the group in the example implementation. UE 104 may transmit the scheduling information through a PSCCH for groupcasting to indicate to UE 106 to receive data on the corresponding PSSCH on resource pool #0 810. Once UE 106 receives data on the PSSCH successfully, UE 106 may then transmit the corresponding SFCI (e.g., including a HARQ feedback) to UE 104 through a PSFCH. The resource of the PSFCH may be four slots (e.g., in the slot #n+4) after the PSSCH (e.g., in the slot #n). In this case, if UE 106 is also configured/indicated to transmit another PSSCH in the slot #n+4 in CC #1 804 for another session link, and the resource of the PSFCH overlaps with the resource of the other PSSCH in at least one OFDM symbol, UE 106 may determine whether to perform the PSSCH/PSCCH transmission in CC #1 804 based on default settings, preconfigured/configured priority parameters, UE capability, etc. For example, UE 106 may decide not to transmit the PSSCH/PSCCH in CC #1 804, but transmit the PSFCH with the SFCI to UE 104. In an alternative example, UE 106 may decide not to transmit the PSFCH with the SFCI to UE 104, but transmit the PSSCH/PSCCH in CC #1 802.

In some of the present implementations, UE 106 may receive data on a PSSCH #1 in the slot #n from UE 104 and expect to transmit the corresponding SFCI through the PSFCH #1 in the slot #n+4. In this case, if UE 106 also receives an aperiodic PSSCH #2 in the slot #n+2 from UE 104 in CC #0 804, and expect to transmit the corresponding SFCI for the aperiodic PSSCH #2 in the same slot #n+4 on CC #0 804, UE 106 may decide to drop the SFCI transmission for the PSFCH #1, because the PSFCH #2 is corresponding to an aperiodic transmission scheme.

In some of the present implementations, UE 106 may receive a discovery signal from another UE through a PSSCH #3 in CC #1 802 and expect to transmit the corresponding feedback of the discovery signal in a slot #n+4 in CC #1 802. In this case, UE 106 may decide to drop the PSFCH transmission to UE 106 because the PSFCH transmission overlaps with the feedback transmission that is associated the discovery procedure in another CC (CC #1 802).

In some of the present implementations, UE 106 may transmit a UE capability message to inform UE 104 that whether UE 106 has the ability to simultaneously transmit/receive signals/channels on different resource pools/BWPs/carriers, and/or to simultaneously transmit/receive signals/channels with different numerologies. If the UE capability message indicates that UE 106 has the ability to perform simultaneous transmissions/receptions, UE 106 may first allocate the TX power for the PSFCH transmission to UE 104, and then allocate the remaining TX power for other PSSCH transmissions to other UEs in other sessions/links.

Figure 9:
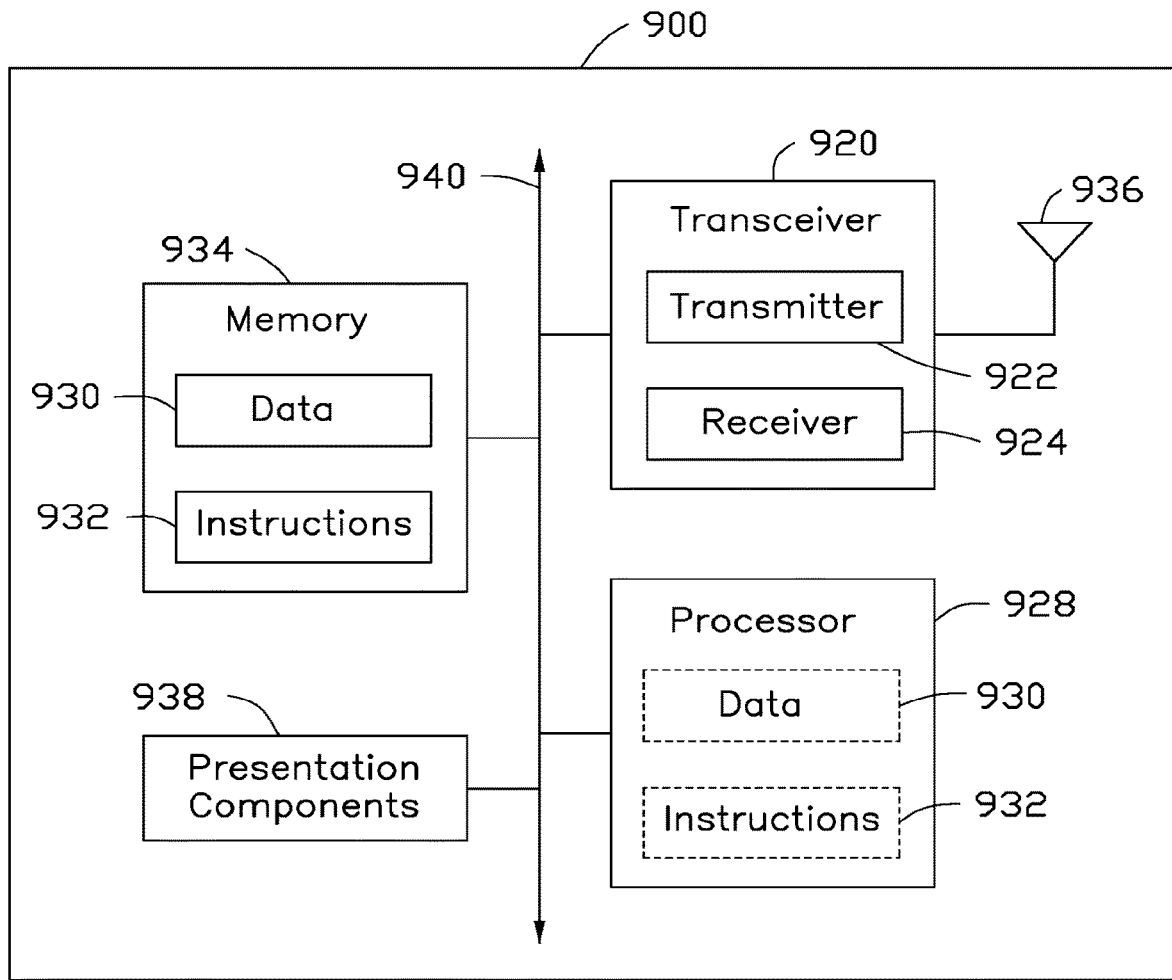
FIG. 9 is a block diagram illustrating a node for wireless communication, in accordance with various aspects of the present disclosure.

FIG. 9 is a block diagram illustrating a node for wireless communication, in accordance with various aspects of the present disclosure. As shown in FIG. 9, node 900 may include transceiver 920, processor 928, memory 934, one or more presentation components 938, and at least one antenna 936. Node 900 may also include an RF spectrum band module, a base station communications module, a network communications module, and a system communications management module, Input/Output (I/O) ports, I/O components, and power supply (not explicitly shown in FIG. 9). Each of these components may be in communication with each other, directly or indirectly, over one or more buses 940. In one implementation, node 900 may be a UE or a base station that performs various functions described herein, for example, with reference to FIGS. 1 through 8.

Transceiver 920 having transmitter 922 (e.g., transmitting/transmission circuitry) and receiver 924 (e.g., receiving/reception circuitry) may be configured to transmit and/or receive time and/or frequency resource partitioning information. In some implementations, the transceiver 920 may be configured to transmit in different types of subframes and slots including, but not limited to, usable, non-usable and flexibly usable subframes and slot formats. The transceiver 920 may be configured to receive data and control channels.

Node 900 may include a variety of computer-readable media. Computer-readable media may be any available media that may be accessed by node 900 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 934 may include computer-storage media in the form of volatile and/or non-volatile memory. Memory 934 may be removable, non-removable, or a combination thereof. Example memory includes solid-state memory, hard drives, optical-disc drives, etc. As illustrated in FIG. 9, memory 934 may store computer-readable, computer-executable instructions 932 (e.g., software codes) that are configured to, when executed, cause processor 928 to perform various functions described herein, for example, with reference to FIGS. 1 through 8. Alternatively, instructions 932 may not be directly executable by processor 928 but be configured to cause node 900 (e.g., when compiled and executed) to perform various functions described herein.

Processor 928 (e.g., having processing circuitry) may include an intelligent hardware device, e.g., a Central Processing Unit (CPU), a microcontroller, an ASIC, etc. Processor 928 may include memory. Processor 928 may process data 930 and instructions 932 received from memory 934, and information through transceiver 920, the base band communications module, and/or the network communications module. Processor 928 may also process information to be sent to transceiver 920 for transmission through antenna 936, to the network communications module for transmission to a core network.

One or more presentation components 938 presents data indications to a person or other device. Examples of presentation components 938 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A wireless communication device comprising:
   a transceiver;
   one or more non-transitory computer-readable media having computer-executable instructions embodied thereon; and
   at least one processor coupled to the transceiver and the one or more non-transitory computer-readable media, and configured to execute the computer-executable instructions to:
      receive, via the transceiver, a configuration comprising a first priority parameter for a first Sidelink Synchronization Signal (SLSS);
      receive, via the transceiver, a Sidelink Control Information (SCI) comprising a second priority parameter for a Physical Sidelink Shared Channel (PSSCH);
      determine whether to transmit the SLSS according to a comparison of the first priority parameter and the second priority parameter when an occasion of the first SLSS collides with a Physical Sidelink Feedback Channel (PSFCH) that carries Sidelink Feedback Control Information (SFCI); and
      transmit, via the transceiver, the SLSS when the comparison indicates that the first SLSS has higher priority than the PSSCH.

2. The wireless communication device of claim 1, wherein the SCI is carried on a Physical Sidelink Control Channel (PSCCH) to the wireless communication device.

3. The wireless communication device of claim 1, wherein the at least one processor is further configured to execute the computer-executable instructions to:
   receive a first signal quality threshold and a second signal quality threshold;
   determine whether to transmit a second SLSS based on the first signal quality threshold when the wireless communication device is engaged in a unicast operation; and
   determine whether to transmit the second SLSS based on the second signal quality threshold when the wireless communication device is engaged in a groupcast operation.

4. The wireless communication device of claim 1, wherein the at least one processor is further configured to execute the computer-executable instructions to:
   obtain a plurality of SLSS transmission configurations when the wireless communication device belongs to a plurality of groups at a same time, wherein devices in a same group have a same group identity (ID); and
   perform SLSS transmissions with the plurality of groups based on the plurality of SLSS transmission configurations.

5. The wireless communication device of claim 1, wherein the wireless communication device is a scheduler source device in a group.

6. The wireless communication device of claim 1, wherein the occasion of the first SLSS is determined to be colliding with the PSFCH when the occasion of the first SLSS overlaps the PSFCH in at least one Orthogonal Frequency Division Multiplexing (OFDM) symbol in time domain.

7. The wireless communication device of claim 1, wherein the occasion of the first SLSS is determined to be colliding with the PSFCH when the occasion of the first SLSS overlaps the PSFCH in at least one resource element.

8. The wireless communication device of claim 1, wherein the occasion of the first SLSS is determined to be colliding with the PSFCH when at least part of the first SLSS and the PSFCH are configured to be transmitted through a plurality of spatial filters at a same time.

9. The wireless communication device of claim 1, wherein the occasion of the first SLSS and the PSFCH are configured on one of:
   different Bandwidth Parts (BWPs);
   different resource pools; and
   different carriers.

10. The wireless communication device of claim 1, wherein the first SLSS is one of a Long Term Evolution (LTE) SLSS, an LTE Physical Broadcast Channel (PBCH), a New Radio (NR) SLSS, an NR PBCH, and an NR Synchronization Signal/PBCH Block (SSB).

11. A method performed by a wireless communication device, the method comprising:
   receiving a configuration comprising a first priority parameter value for a first Sidelink Synchronization Signal (SLSS);
   receiving a Sidelink cControl iInformation (SCI) comprising a second priority parameter for a Physical Sidelink Shared Channel (PSSCH);
   determining whether to transmit the SLSS according to a comparison of the first priority value parameter and the second priority parameter when an occasion of the first SLSS collides with a Physical Sidelink Feedback Channel (PSFCH) that carries Sidelink Feedback Control Information (SFCI); and
   transmitting the SLSS when the comparison indicates that the first SLSS has higher priority than the PSSCH.

12. The method of claim 11, wherein the SCI is carried on a Physical Sidelink Control Channel (PSCCH) to the wireless communication device.

13. The method of claim 11, further comprising:
   receiving a first signal quality threshold and a second signal quality threshold;
   determining whether to transmit a second SLSS based on the first signal quality threshold when the wireless communication device is engaged in a unicast operation; and
   determining whether to transmit the second SLSS based on the second signal quality threshold when the wireless communication device is engaged in a groupcast operation.

14. The method of claim 11, further comprising:
   obtaining a plurality of SLSS transmission configurations when the wireless communication device belongs to a plurality of groups at a same time, wherein devices in a same group have a same group identity (ID); and
   performing SLSS transmissions with the plurality of groups based on the plurality of SLSS transmission configurations.

15. The method of claim 11, wherein the wireless communication device is a scheduler source device in a group.

16. The method of claim 11, wherein the occasion of the first SLSS is determined to be colliding with the PSFCH when the occasion of the first SLSS overlaps the PSFCH in at least one Orthogonal Frequency Division Multiplexing (OFDM) symbol in time domain.

17. The method of claim 11, wherein the occasion of the first SLSS is determined to be colliding with the PSFCH when the occasion of the first SLSS overlaps the PSFCH in at least one resource element.

18. The method of claim 11, wherein the occasion of the first SLSS is determined to be colliding with the PSFCH when at least part of the first SLSS and the PSFCH are configured to be transmitted through a plurality of spatial filters at a same time.

19. The method of claim 11, wherein the occasion of the first SLSS and the PSFCH are configured on one of:
   different Bandwidth Parts (BWPs);
   different resource pools; and
   different carriers.

20. The method of claim 11, wherein the first SLSS is one of a Long Term Evolution (LTE) SLSS, an LTE Physical Broadcast Channel (PBCH), a New Radio (NR) SLSS, an NR PBCH, and an NR Synchronization Signal/PBCH Block (SSB).

\* \* \* \* \*